(12) United States Patent
Wu

(10) Patent No.: US 8,613,290 B1
(45) Date of Patent: Dec. 24, 2013

(54) ANTI-INUNDATION AND DRAINAGE STRUCTURE FOR A ANTI-FREEZE FAUCET

(71) Applicant: Cheng-Hsuan Wu, Lugang Township, Changhua County (TW)

(72) Inventor: Cheng-Hsuan Wu, Lugang Township, Changhua County (TW)

( * ) Notice: Subject to any disclaimer, the term of this patent is extended or adjusted under 35 U.S.C. 154(b) by 0 days.

(21) Appl. No.: 13/739,058

(22) Filed: Jan. 11, 2013

(51) Int. Cl.
*F16K 24/00* (2006.01)

(52) U.S. Cl.
USPC .............................. 137/218; 137/59; 137/360

(58) Field of Classification Search
USPC ........... 137/59, 60, 218, 301, 302, 360, 454.5
See application file for complete search history.

(56) References Cited

U.S. PATENT DOCUMENTS

| | | | | |
|---|---|---|---|---|
| 5,392,805 A | * | 2/1995 | Chrysler ........................ | 137/218 |
| 5,740,831 A | * | 4/1998 | DeNardo et al. .............. | 137/218 |
| 6,142,172 A | * | 11/2000 | Shuler et al. ................... | 137/360 |
| 6,761,183 B1 | * | 7/2004 | Hoeptner, III ................. | 137/218 |
| 6,769,446 B1 | * | 8/2004 | Ball et al. .......................... | 137/59 |
| 7,140,390 B2 | * | 11/2006 | Berkman et al. ............ | 137/614.2 |
| 7,549,444 B2 | | 6/2009 | Li et al. | |
| 7,654,280 B2 | | 2/2010 | Wu | |
| 8,402,991 B2 | * | 3/2013 | Wu ............................... | 137/301 |
| 2005/0161087 A1 | * | 7/2005 | Brattoli et al. ................ | 137/360 |

* cited by examiner

*Primary Examiner* — John K Fristone, Jr.
*Assistant Examiner* — Reinaldo Sanchez-Medina
(74) *Attorney, Agent, or Firm* — Alan Kamrath; Kamrath IP Lawfirm, P.A.

(57) ABSTRACT

An anti-inundation and drainage structure for an anti-freeze faucet contains a tube body, a controlling valve, and a control assembly. The tube body includes a chamber, an inlet, an outlet, and a coupling hole. The controlling valve is fixed in the chamber and includes a housing, an axial bolt, a first check device, a connector, a second check device, a ceramic shifting piece, a ceramic fixing piece, and a positioning member. The control assembly is coupled with the coupling hole and includes a rotating member connecting with a rod in the chamber of the tube body, the rod has a hollow passage defined therein and an air port formed on one end thereof so as to couple with the rotating member, another end of the rod relative to the air port is inserted into the second segment of the slot of the connector of the controlling valve.

7 Claims, 10 Drawing Sheets

US 8,613,290 B1

ANTI-INUNDATION AND DRAINAGE STRUCTURE FOR A ANTI-FREEZE FAUCET

BACKGROUND OF THE INVENTION

1. Field of the Invention

The present invention relates to an anti-freeze faucet, and more particularly to an anti-inundation and drainage structure for an anti-freeze faucet that can prevent water being frozen in the anti-freeze faucet in a frigid weather.

2. Description of the Prior Art

A conventional anti-freeze faucet is used in a frigid environment so as to prevent water from freezing therein because the water does not discharge completely. U.S. Pat. No. 7,654,280 and U.S. Pat. No. 7,549,444 disclose that a tube body of a faucet includes an intake valve fixed thereon, and after turning off the faucet, the intake valve generates an air inflow effect so that the water discharges out of the tube body. But because the intake valve is limited and its air hole has a limited diameter, a vacuum breaking effect can not generate. Besides, a check plug is pushed by a spring so as to close an orifice, so when the faucet is turned off, air pressure in exterior is not enough to push the check plug to abut against the spring. Accordingly, the tube body cannot communicate with the exterior via the orifice, and a part of water maintains in the tube body and freezes, thus obstructing the faucet.

The present invention has arisen to mitigate and/or obviate the afore-described disadvantages.

SUMMARY OF THE INVENTION

The primary object of the present invention is to provide an anti-inundation and drainage structure for an anti-freeze faucet in which a chamber of a tube body communicates with an exterior environment via an air vent of a connector of a controlling valve, a passage of a rod of a control assembly, and an air port of the rod of the control assembly after turning off the anti-freeze faucet, thus obtaining a vacuum break purpose. Thereby, exterior air flows into the chamber of the tube body via the passage of the rod of the control assembly and the air vent of the connector of the controlling valve, and water in the chamber of the tube body discharges out of an outlet of the tube body completely, thus preventing the water from freezing in the chamber of the tube body.

An anti-freeze vacuum breaking structure for a faucet in accordance with a preferred embodiment of the present invention contains:

a tube body including a chamber defined therein, an inlet formed on one end thereof, an outlet formed on another end thereof, a connecting hole, and an intake valve, the inlet, the outlet, the connecting hole, and the intake valve communicating with the chamber;

a controlling valve fixed in the chamber of the tube body and including a housing, a shaft bolt, a rod, a stopping sleeve, an upper ceramic piece, a lower ceramic piece, and a seat, the shaft bolt being inserted into the housing and having a connecting segment and an actuating segment relative to the connecting segment, a watering room extending from the actuating segment of the shaft bolt, a through hole extending from the connecting segment to communicate with the watering room, the shaft bolt including an outflow orifice defined on an outer side thereof to communicate with the watering room, the connecting segment and the outflow orifice extending out of the housing, the rod being inserted into the shaft bolt and including an increased shoulder arranged on one end thereof, the shoulder including a first stopping ring fitted thereon, the rod also including a decreased fitting section defined on another end thereof relative to the increased shoulder, the decreased fitting section having a resilient element fitted thereon, an air channel, and an air bore to communicate with the air channel, the rod including a second stopping ring fitted on an outer peripheral wall thereof adjacent to the fitting section, the upper ceramic piece being fitted in the housing to engage and drive the actuating segment of the shaft bolt, the lower ceramic piece being fitted in the housing and contacting with the upper ceramic piece, the seat screwing with the housing and including an intake passed therein;

a handle connected with the connecting hole of the tube body and including a rotating member coupling with a driving stem and inserted in the chamber of the tube body, the driving stem being hollow and including one end with an aperture to connect with the rotating member and including another end fitted with the connecting segment of the shaft bolt of the controlling valve.

DETAILED DESCRIPTION OF THE PREFERRED EMBODIMENTS

Figure 1:
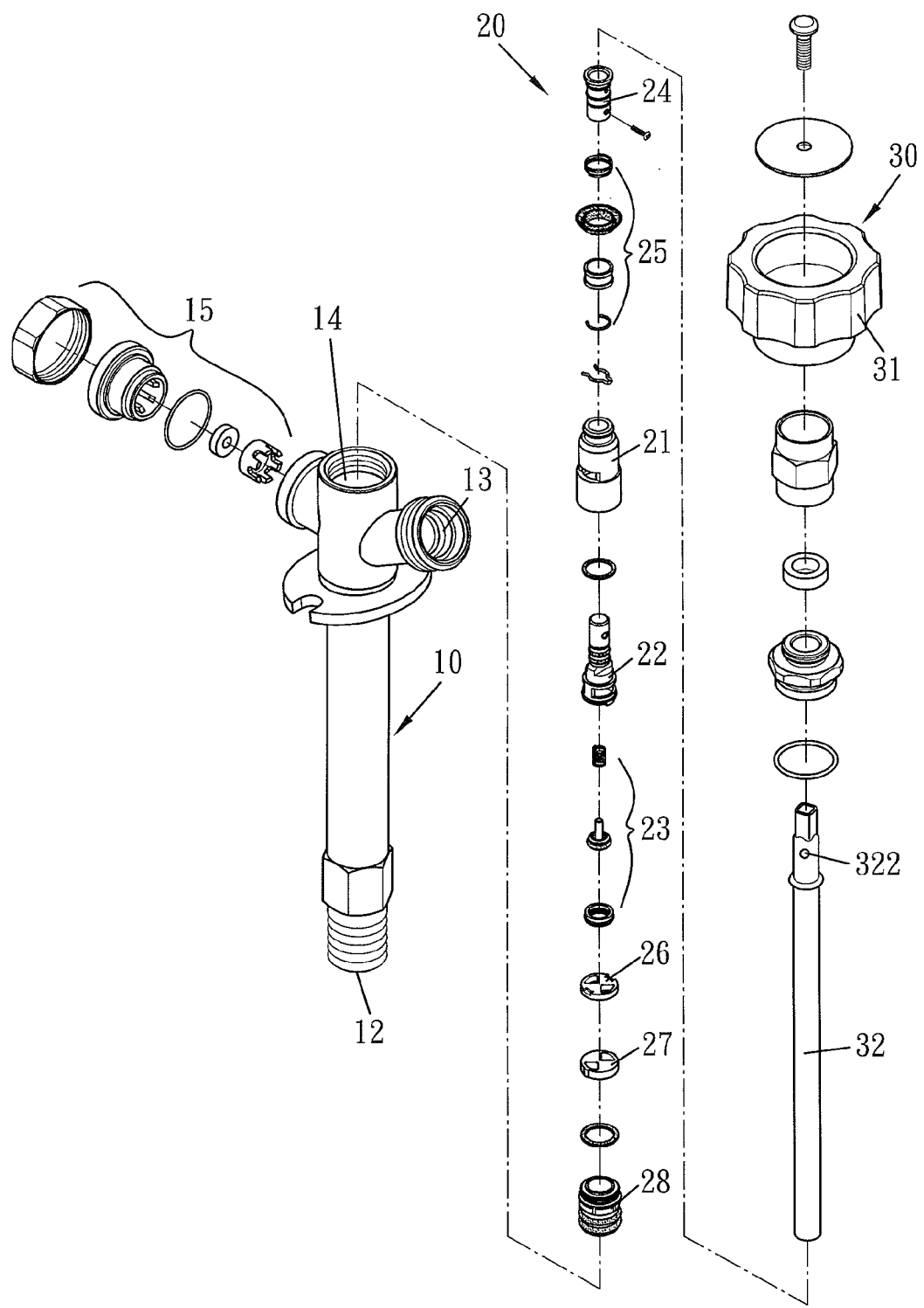
FIG. 1 is a perspective view showing the exploded components of an anti-inundation and drainage structure for an anti-freeze faucet in accordance with a preferred embodiment of the present invention.
Figure 2:
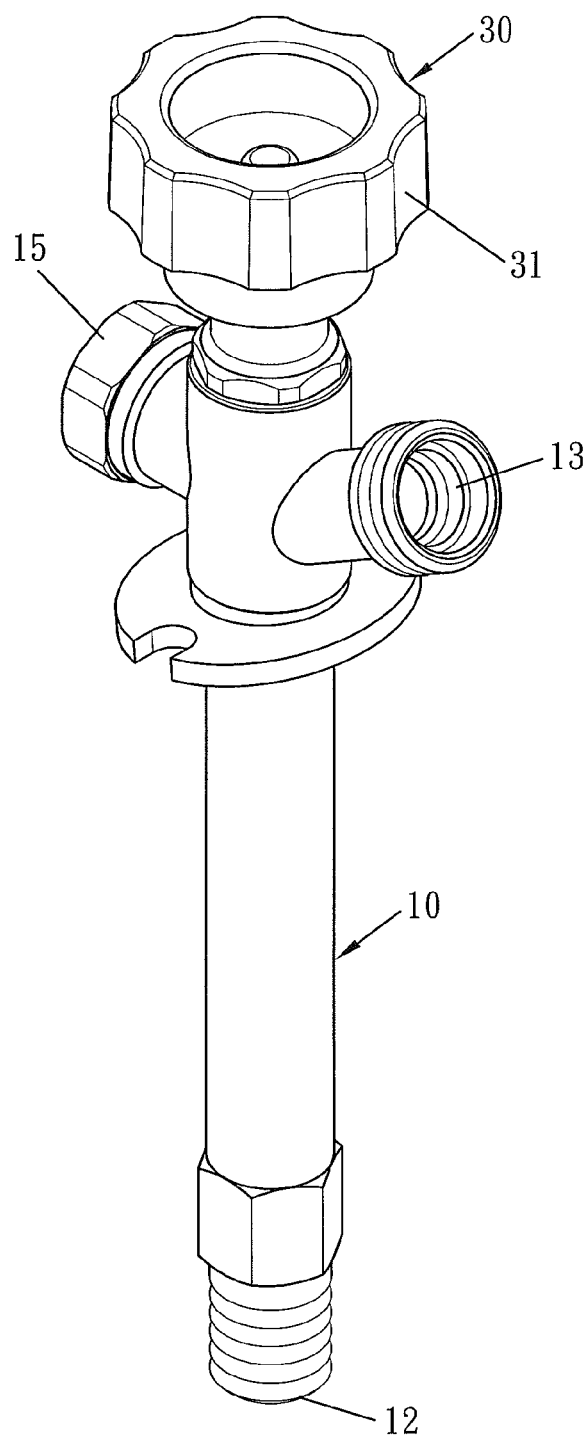
FIG. 2 is a perspective view showing the assembly of the anti-inundation and drainage structure for the anti-freeze faucet in accordance with the preferred embodiment of the present invention.
Figure 3:
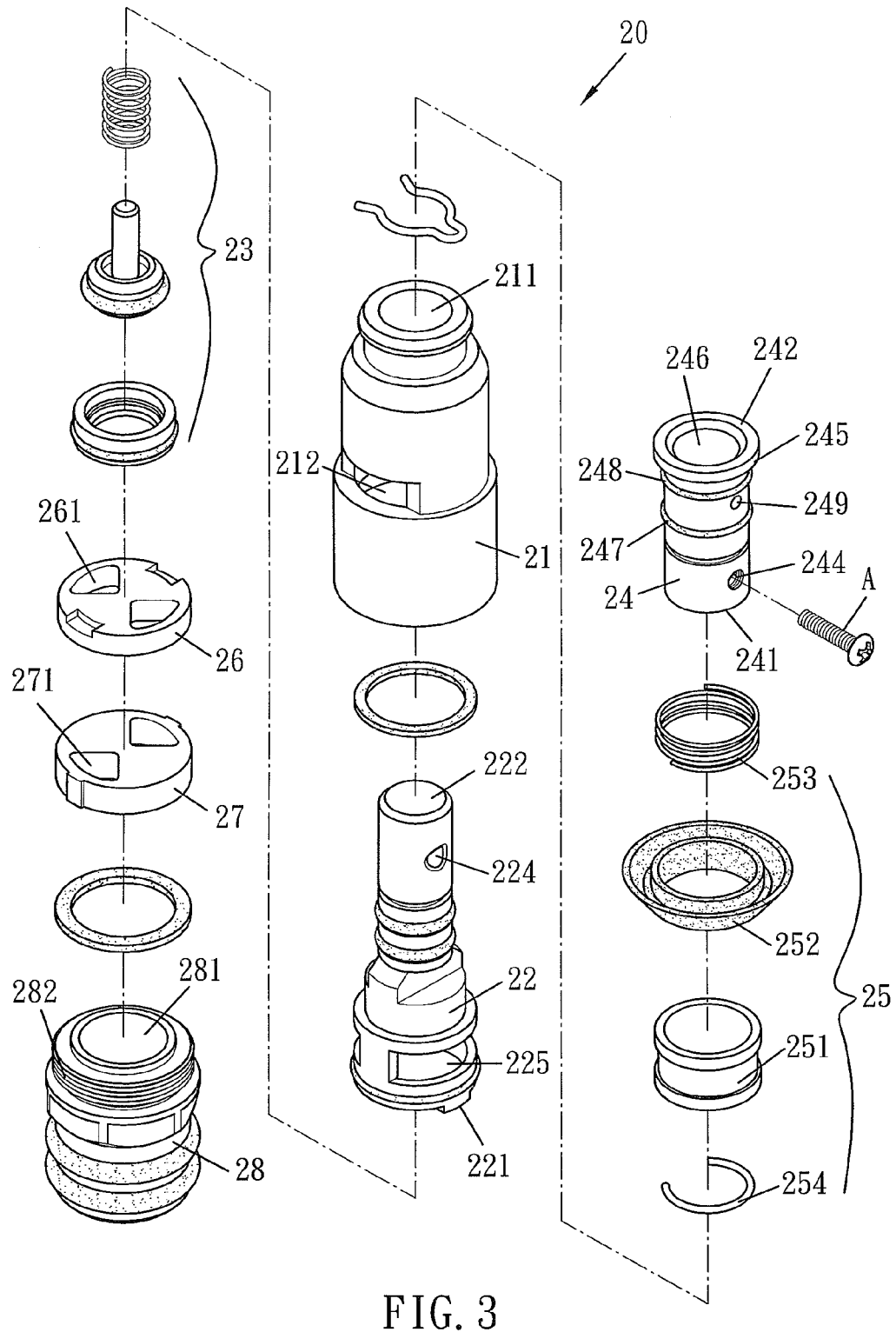
FIG. 3 is a perspective view showing the exploded components of a controlling valve of the anti-inundation and drainage structure for the anti-freeze faucet in accordance with the preferred embodiment of the present invention.
Figure 4:
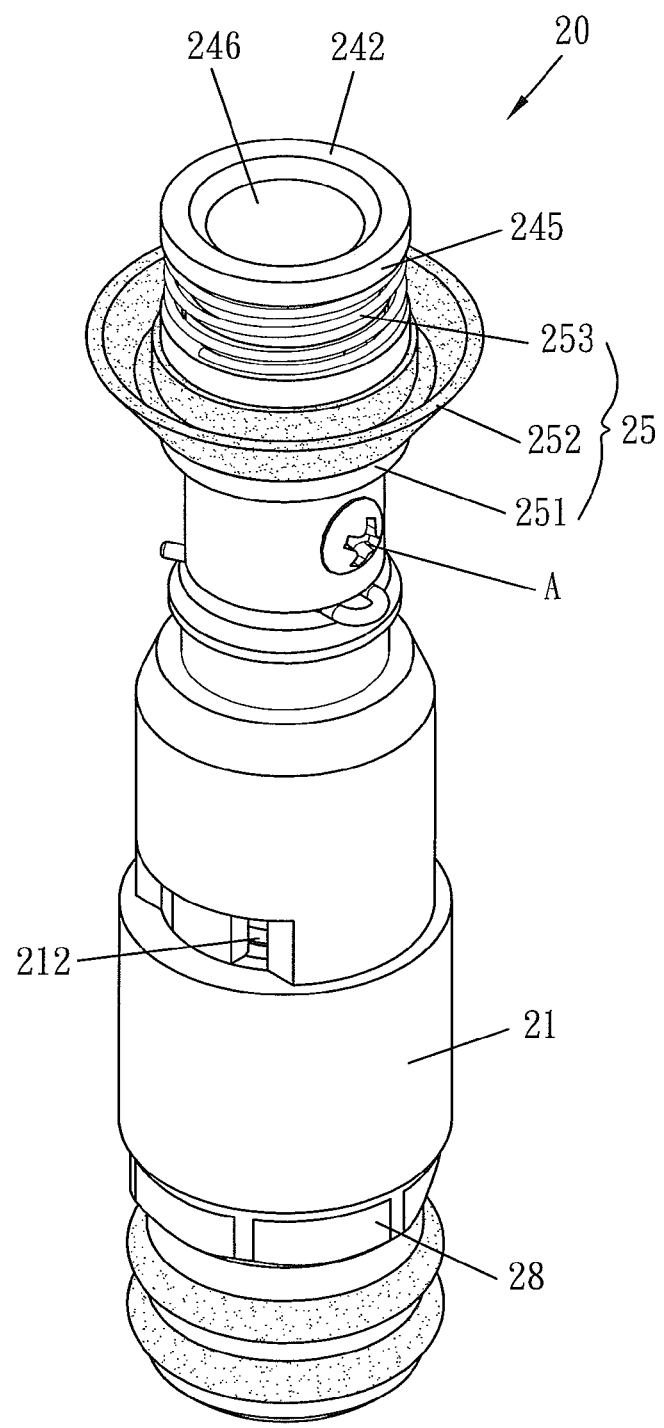
FIG. 4 is a perspective view showing the assembly of the controlling valve of the anti-inundation and drainage structure for the anti-freeze faucet in accordance with the preferred embodiment of the present invention.
Figure 5:
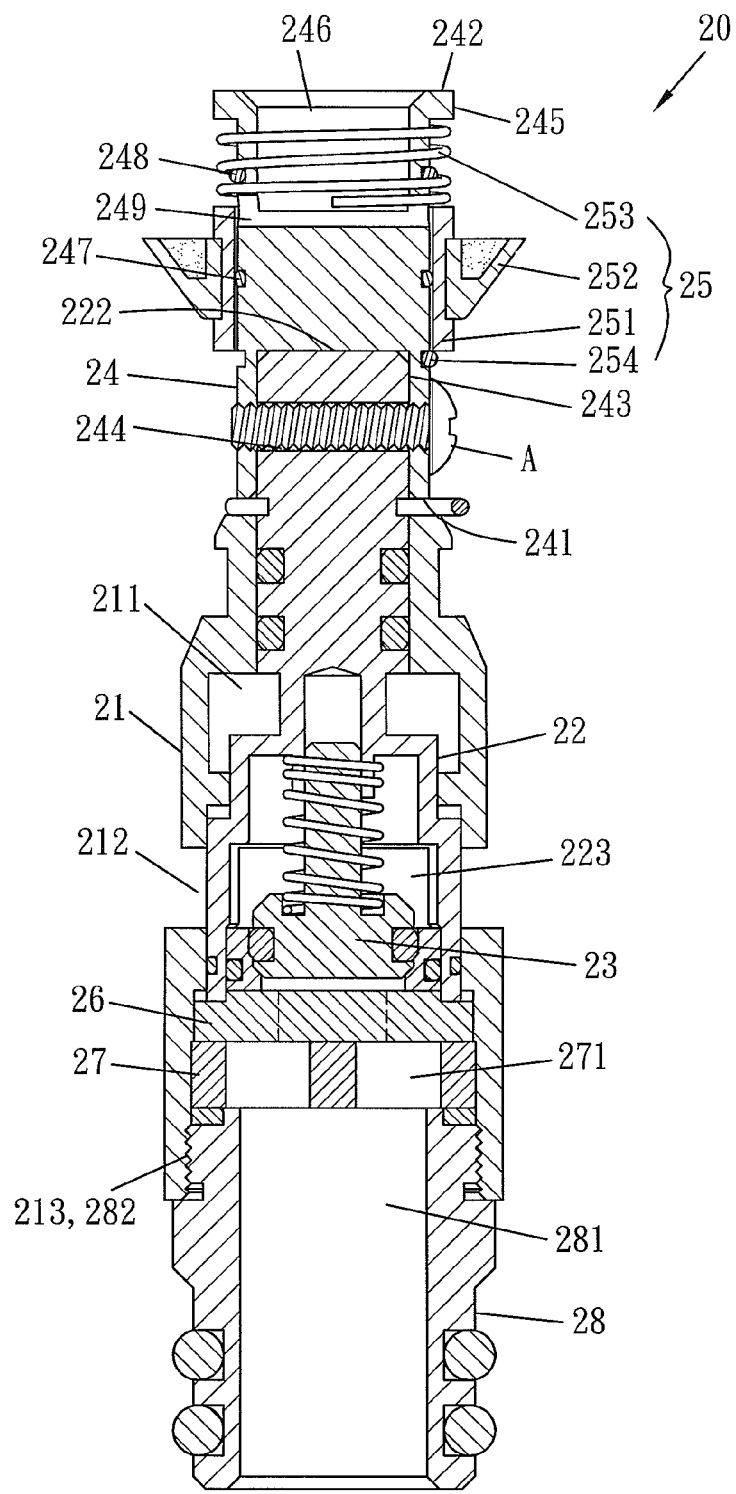
FIG. 5 is a cross-sectional perspective view of the controlling valve of the anti-inundation and drainage structure for the anti-freeze faucet in accordance with the preferred embodiment of the present invention.
Figure 6:
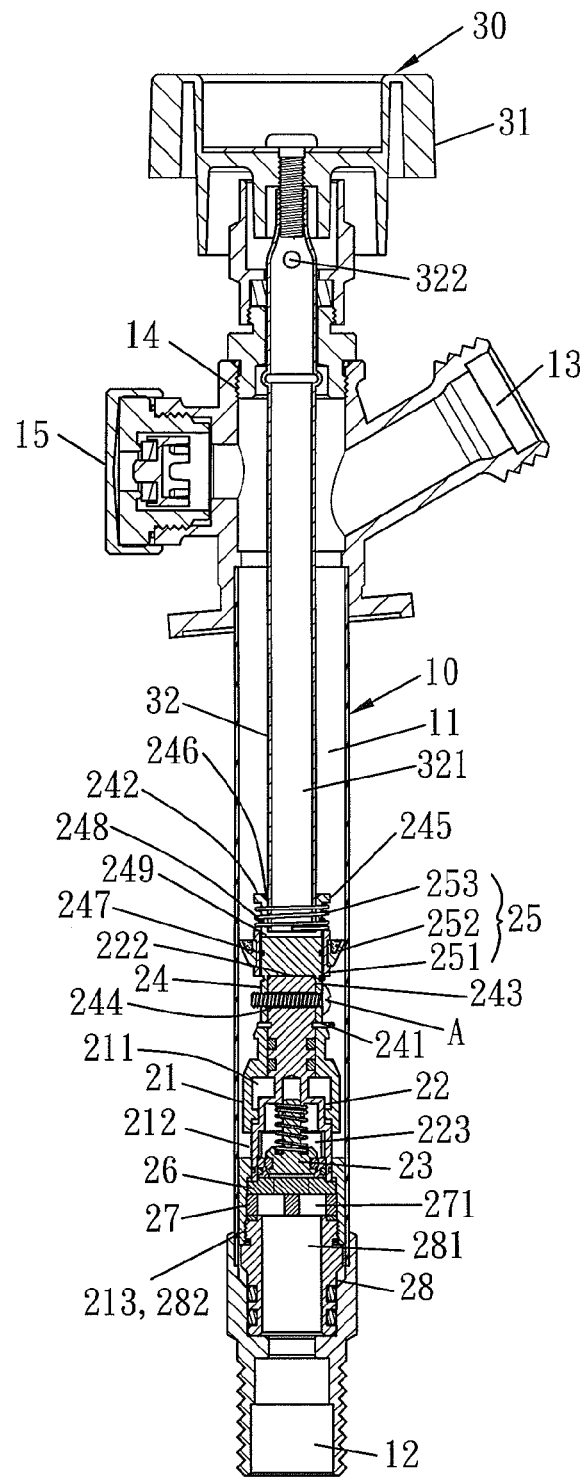
FIG. 6 is a cross-sectional view showing the assembly of the anti-inundation and drainage structure for the anti-freeze faucet in accordance with the preferred embodiment of the present invention.
Figure 7:
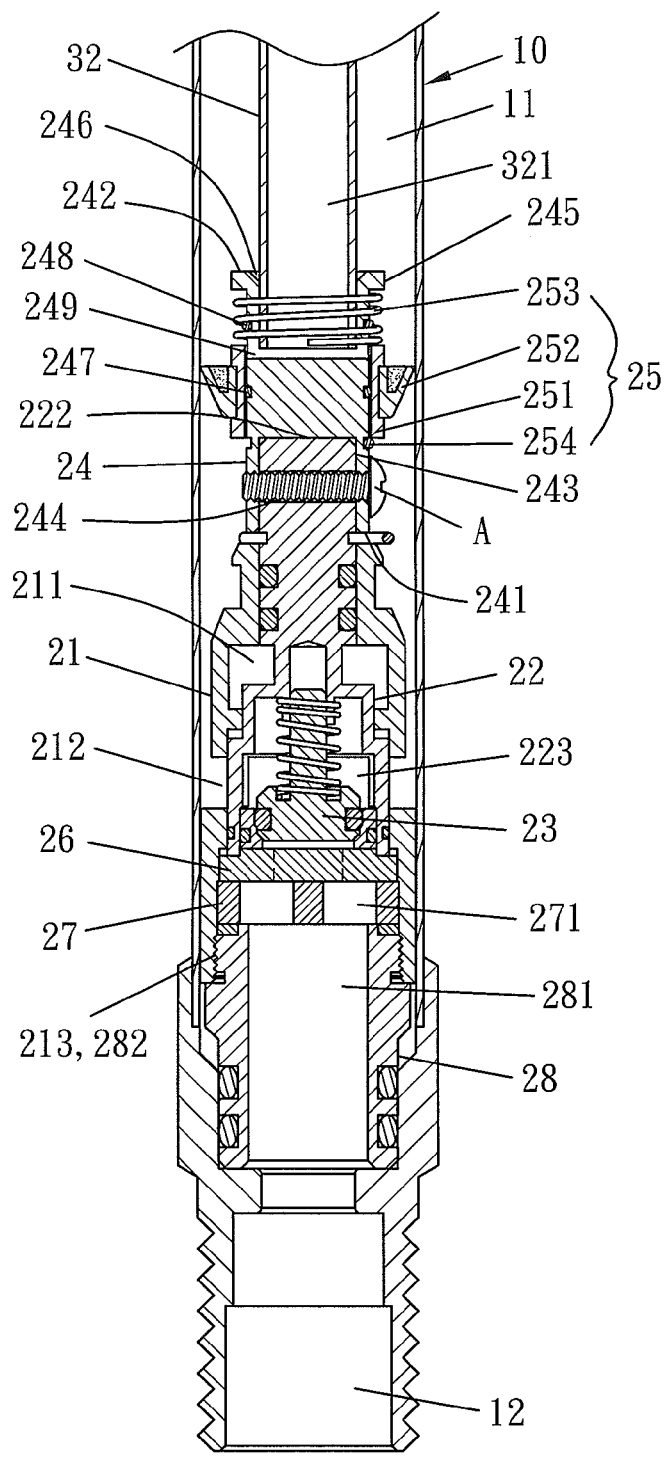
FIG. 7 is a cross-sectional view showing the assembly of a part of the anti-inundation and drainage structure for the anti-freeze faucet in accordance with the preferred embodiment of the present invention.

The present invention will be clearer from the following description when viewed together with the accompanying drawings, which show, for purpose of illustrations only, the preferred embodiment in accordance with the present invention.

Referring to FIGS. 1-7, an anti-inundation and drainage structure for an anti-freeze faucet according to a preferred embodiment of the present invention comprises a tube body 10, a controlling valve 20, and a control assembly 30.

The tube body 10 includes, a chamber 11 defined therein, an inlet 12 formed on one end thereof so as to connect with an inlet pipe, an outlet 13 arranged on another end thereof, a coupling hole 14 adjacent to the outlet 13, and an intake valve 15 proximate to the coupling hole 14. The inlet 12, the outlet 13, the coupling hole 14, and the intake valve 15 are in communication with the chamber 11.

The controlling valve 20 is fixed in the chamber 11 of the tube body 10 and includes a housing 21, an axial bolt 22, a first check device 23, a connector 24, a second check device 25, a ceramic shifting piece 26, a ceramic fixing piece 27, and a positioning member 28. The housing 21 has, an orifice 211 formed therein, a first water aperture 212 defined on a peripheral side thereof and communicating with the orifice 211, and a first screwing section 213 with inner threads arranged on one end of the orifice 211. The axial bolt 22 is inserted into the orifice 211 of the housing 21 and has a driving segment 221 and a connecting segment 222 relative to the driving segment 221. The driving segment 221 is located at the orifice 211 of the housing 21. The axial bolt 22 also has a water outflow room 223 defined in the driving segment 221 thereof and a coupling opening 224 proximate to the connecting segment 222. The connecting segment 222 and the coupling opening 224 extend out of the housing 21. The axial bolt 22 further has a second water aperture 225 formed on an outer wall thereof and communicating with the water outflow room 223. The first check device 23 is disposed in the water outflow room 223 of the axial bolt 22. The connector 24 is cylindrical and has a first segment 241 and a second segment 242 relative to the first segment 241. The first segment 241 has a joining groove 243 defined on an end surface thereof so that a part of the connecting segment 222 of the axial bolt 22 inserts into the joining groove 243. The connector 24 also has a fixing hole 244 adjacent to the first segment 241 and aligning with the coupling opening 224 of the axial bolt 22, and the fixing hole 244 and the coupling opening 224 are used to insert and lock a screw bolt A, such that the connector 24 and the axial bolt 22 connect together. In addition, the second segment 242 has a projected stopping rim 245 and a slot 246 formed on an end surface thereof. The connector 24 also has two seal rings 247, 248 fitted between the first segment 241 and the second segment 242, and between the two seal rings 247, 248 is defined an air vent 249 for communicating with the slot 246. The second check device 25 has a checking member 251 fitted on the connector 24, an unidirectional sealing washer 252 fitted on the checking member 251, a spring 253 fitted on the connector 24 and abutting against the stopping rim 245 of the connector 24 and the checking member 251, and a retaining loop 254 retained on the connector 24 and limiting the checking member 251, such that the air vent 249 of the connector 24 flows air smoothly. The ceramic shifting piece 26 is fitted in the housing 21 and retains with and drives the driving segment 221 of the axial bolt 22. The ceramic shifting piece 26 has two flowing apertures 261 symmetrically defined thereon. Furthermore, the ceramic fixing piece 27 is retained in the housing 21 and contacts with the ceramic shifting piece 26. The ceramic fixing piece 27 has two intakes 271 symmetrically formed thereon. The positioning member 28 has a channel 281 axially arranged therein and a second screwing section 282 with outer threads fixed on one end thereof so as to screw with the first screwing section 213 of the housing 21, thus fixing the axial bolt 22, the first check device 23, the ceramic shifting piece 26, and the ceramic fixing piece 27.

The control assembly 30 is coupled with the coupling hole 14 of the tube body 10 and includes a rotating member 31 connecting with a rod 32 in the chamber 11 of the tube body 10. The rod 32 has a hollow passage 321 defined therein and an air port 322 formed on one end thereof so as to couple with the rotating member 31, another end of the rod 32 relative to the air port 322 is inserted into the slot 246 of the connector 24 of the controlling valve 20, such that the passage 321 of the rod 32 is in communication with the air vent 249 of the connector 24.

Figure 8:
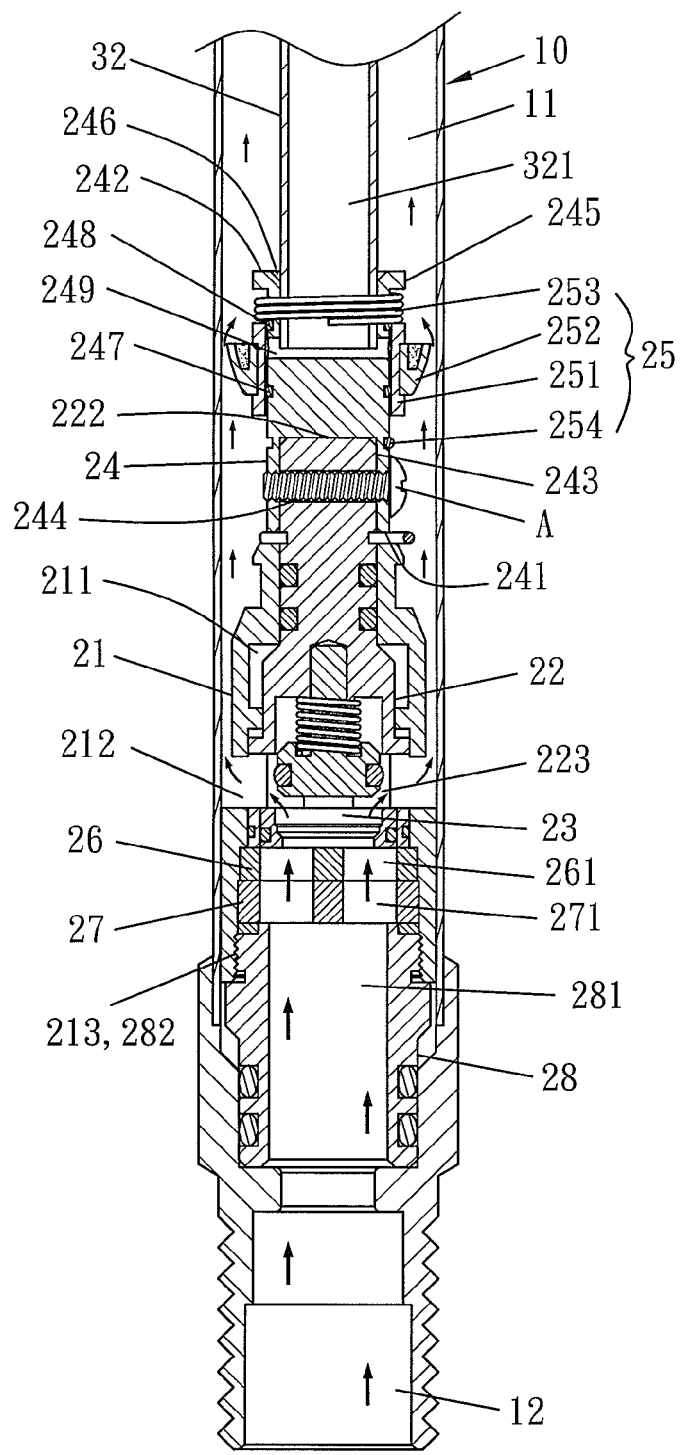
FIG. 8 is a cross-sectional view showing the operation of the anti-inundation and drainage structure for the anti-freeze faucet in accordance with the preferred embodiment of the present invention

Referring to FIG. 8, as turning on an anti-freeze faucet, the rotating member 31 of the control assembly 30 drives the rod 32, and then the rod 32 drives the axial bolt 22 of the controlling valve 20 to rotate an angle, thereafter the driving segment 221 of the axial bolt 22 drives the ceramic shifting piece 26 to rotate simultaneously so that the two flowing apertures 261 of the ceramic shifting piece 26 align and communicate with the two intakes 271 of the ceramic fixing piece 27, hence water flows into the chamber 11 of the housing 10 via the channel 281 of the positioning member 28 of the controlling valve 20, the two intakes 271 of the ceramic fixing piece 27, the two flowing apertures 261 of the ceramic shifting piece 26, the first check device 23, a second water apertures 225 of the axial bolt 22, and the first water aperture 212 of the housing 21 from the inlet 12 of the tube body 10. Finally, the water flows out of the outlet 13 of the tube body 10 via the unidirectional sealing washer 252 of the second check device 25 so as to supply the water. In addition, when the water flows through the unidirectional sealing washer 252 of the second check device 25, it pushes the checking member 251 of the second check device 25 toward the second segment 242 of the connector 24 so that the checking member 251 matches with the two seal rings 247, 248 of the connector 24 to close the air vent 249 of the connector 24.

Figure 9:
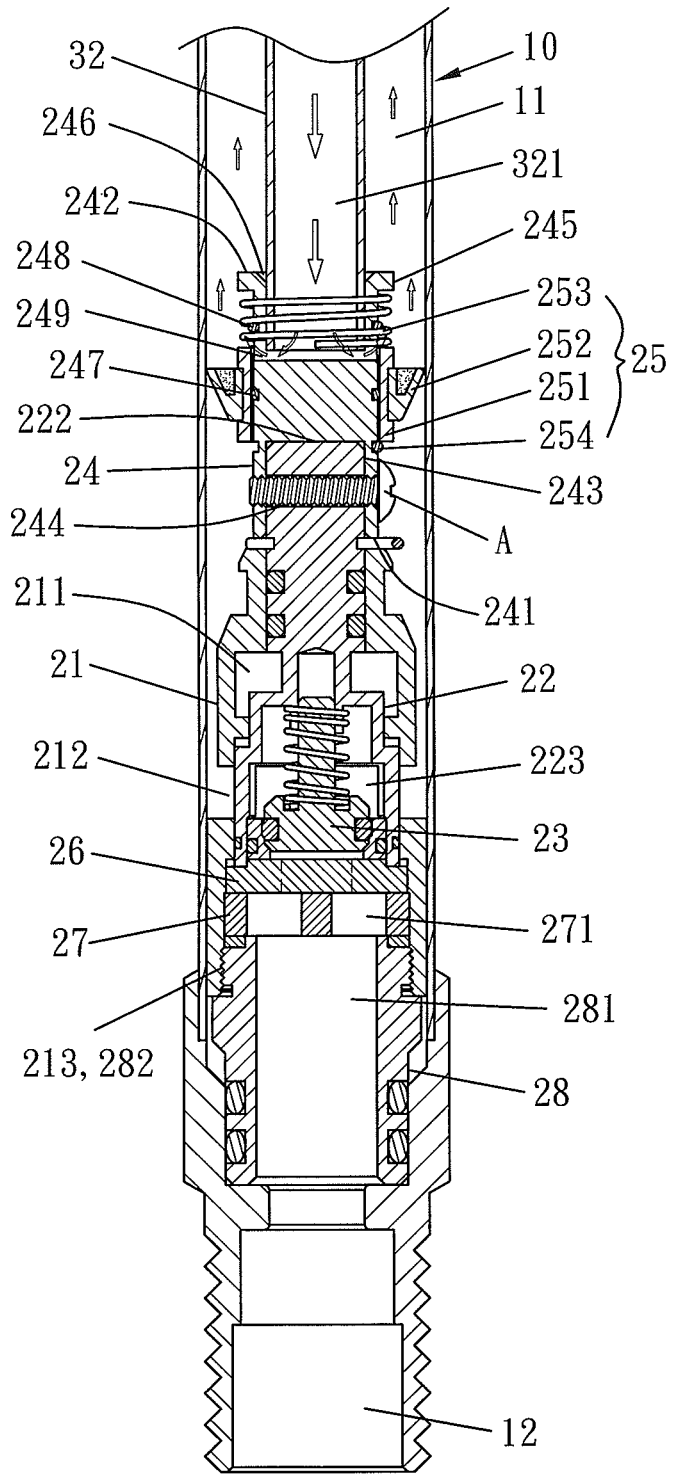
FIG. 9 is another cross-sectional view showing the operation of the anti-inundation and drainage structure for the anti-freeze faucet in accordance with the preferred embodiment of the present invention

As shown in FIG. 9, when turning off the anti-freeze faucet, the rotating member 31 of the control assembly 30 is rotated adversely, and then the rod 32 drives the axial bolt 22 of the controlling valve 20 to rotate back to an original position, thereafter the driving segment 221 of the axial bolt 22 drives the ceramic shifting piece 26 to rotate simultaneously so that the two flowing apertures 261 of the ceramic shifting piece 26 do not align and communicate with the two intakes 271 of the ceramic fixing piece 27, thus forming a close state. In the meantime, the spring 253 of the second check device 25 of the controlling valve 20 pushes the checking member 251 back to an original position, such that the air vent 249 of the connector 24 of the controlling valve 20 opens so that exterior air flows into the chamber 11 of the tube body 10 via the passage 321 of the rod 32 of the control assembly 30 and the air vent 249 of the connector 24 of the controlling valve 20 from the air port 322 of the rod 32 of the control assembly 30, and the intake valve 15 of the tube body 10 generates an air inflow effect, thus obtaining a vacuum break purpose. Thereby, the water in the chamber 11 of the tube body 10 discharges out of the outlet 13 of the tube body 10.

Figure 10:
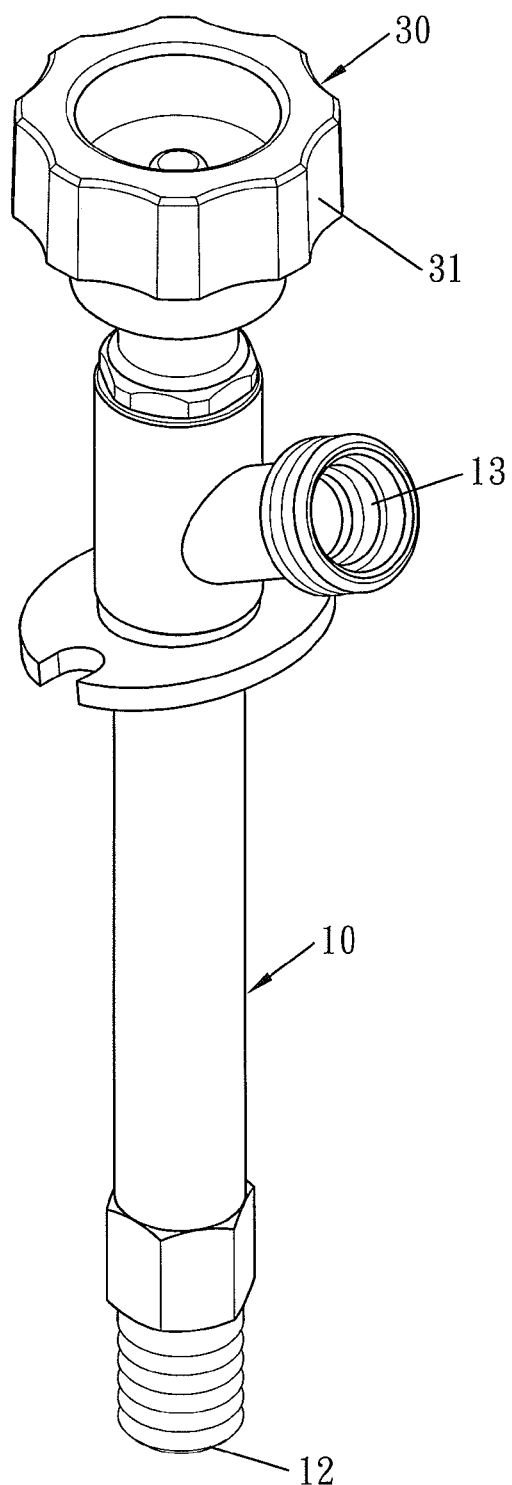
FIG. 10 is a perspective view showing the assembly of an anti-inundation and drainage structure for an anti-freeze faucet in accordance with another preferred embodiment of the present invention.

As illustrated in FIG. 10, the controlling valve 20 and the control assembly 30 are fixed on a tube body 10' without the intake valve 15, wherein as turning off the anti-freeze faucet, the chamber 11 of the tube body 10 communicates with an exterior environment through the air vent 249 of the connector 24 of the controlling valve 20, the passage 321 of the rod 32 of the control assembly 30, and the air port 322 of the rod 32 of the control assembly 30, thus obtaining a vacuum break purpose. Thereby, the water in the chamber 11 of the tube body 10 discharges out of the outlet 13 of the tube body 10.

From above-mentioned descriptions, the chamber 11 of the tube body 10 of the anti-inundation and drainage structure of the present invention communicates with the exterior environment via the air vent 249 of the connector 24 of the controlling valve 20, the passage 321 of the rod 32 of the control assembly 30, and the air port 322 of the rod 32 of the control assembly 30 after turning off the anti-freeze faucet, thus obtaining a vacuum break purpose. Thereby, the exterior air flows into the chamber 11 of the tube body 10 via the passage 321 of the rod 32 of the control assembly 30 and the air vent 249 of the connector 24 of the controlling valve 20 from the air port 322 of the rod 32 of the control assembly 30, and the water in the chamber 11 of the tube body 10 discharges out of the outlet 13 of the tube body 10 completely, thus preventing the water from freezing in the chamber 11 of the tube body 10.

While we have shown and described various embodiments in accordance with the present invention, it is clear to those skilled in the art that further embodiments may be made without departing from the scope of the present invention.

What is claimed is:

1. An anti-inundation and drainage structure for an anti-freeze faucet comprising:
    a tube body including, a chamber defined therein, an inlet formed on one end thereof, an outlet arranged on another end thereof, and a coupling hole adjacent to the outlet, and the inlet, the outlet, the coupling hole being in communication with the chamber;
    a controlling valve fixed in the chamber of the tube body and including a housing, an axial bolt, a connector, a second check device, a ceramic shifting piece, a ceramic fixing piece, and a positioning member, the housing having, a first water aperture defined on a peripheral side thereof, the axial bolt being inserted into the housing and having a driving segment and a connecting segment relative to the driving segment, the driving segment being located at the housing, the axial bolt also having a water outflow room defined in the driving segment thereof and a coupling opening extending out of the housing, the axial bolt further having a second water aperture formed on an outer wall thereof and communicating with the water outflow room, the connector being cylindrical and having a first segment and a second segment relative to the first segment, the first segment connecting with the connecting segment of the axial bolt, the second segment having a projected stopping rim and a slot formed on an end surface thereof, the connector also having two seal rings fitted between the first segment and the second segment, and between the two seal rings being defined an air vent for communicating with the slot; the second check device having a checking member fitted on the connector, an unidirectional sealing washer fitted on the checking member, a spring fitted on the connector and abutting against the stopping rim and the slot, such that the air vent of the connector flows air smoothly; the ceramic shifting piece being fitted in the housing and retaining with and driving the driving segment of the axial bolt; the ceramic fixing piece being retained in the housing and contacts with the ceramic shifting piece, the positioning member having a channel axially arranged therein and screwing with the housing; and
    a control assembly coupled with the coupling hole of the tube body and including a rotating member connecting with a rod in the chamber of the tube body, the rod having a hollow passage defined therein and an air port formed on one end thereof so as to couple with the rotating member, another end of the rod relative to the air port being inserted into the second segment of the slot of the connector of the controlling valve.

2. The anti-inundation and drainage structure for the anti-freeze faucet as claimed in claim 1, wherein the tube body also includes an outlet arranged on another end thereof and an intake valve proximate to the coupling hole for communicating with the chamber.

3. The anti-inundation and drainage structure for the anti-freeze faucet as claimed in claim 2, wherein the controlling valve also includes a first check device disposed in the water outflow room of the axial bolt.

4. The anti-inundation and drainage structure for the anti-freeze faucet as claimed in claim 2, wherein the first segment of the connector has a joining groove defined on an end surface thereof so that a part of the connecting segment of the axial bolt inserts into the joining groove, the connector also has a fixing hole adjacent to the first segment and aligning with the coupling opening of the axial bolt, and the fixing hole and the coupling opening are used to insert and lock a screw bolt, such that the first segment of the connector and the connecting segment of the axial bolt connect together.

5. The anti-inundation and drainage structure for the anti-freeze faucet as claimed in claim 1, wherein the controlling valve also includes a first check device disposed in the water outflow room of the axial bolt.

6. The anti-inundation and drainage structure for the anti-freeze faucet as claimed in claim 1, wherein the first segment of the connector has a joining groove defined on an end surface thereof so that a part of the connecting segment of the axial bolt inserts into the joining groove, the connector also has a fixing hole adjacent to the first segment and aligning with the coupling opening of the axial bolt, and the fixing hole and the coupling opening are used to insert and lock a screw bolt, such that the first segment of the connector and the connecting segment of the axial bolt connect together.

7. The anti-inundation and drainage structure for the anti-freeze faucet as claimed in claim 1, wherein the second check device also has a retaining loop retained on the connector and limiting the checking member.

* * * * *